J. DAVIDSON, Jr.
APPARATUS FOR SUPPORTING TRAIN PIPES.
APPLICATION FILED AUG. 25, 1910.

985,149.

Patented Feb. 28, 1911.

2 SHEETS—SHEET 1.

Witnesses:

Inventor:
John Davidson, Jr.

J. DAVIDSON, Jr.
APPARATUS FOR SUPPORTING TRAIN PIPES.
APPLICATION FILED AUG. 25, 1910.
985,149.
Patented Feb. 28, 1911.
2 SHEETS—SHEET 2.
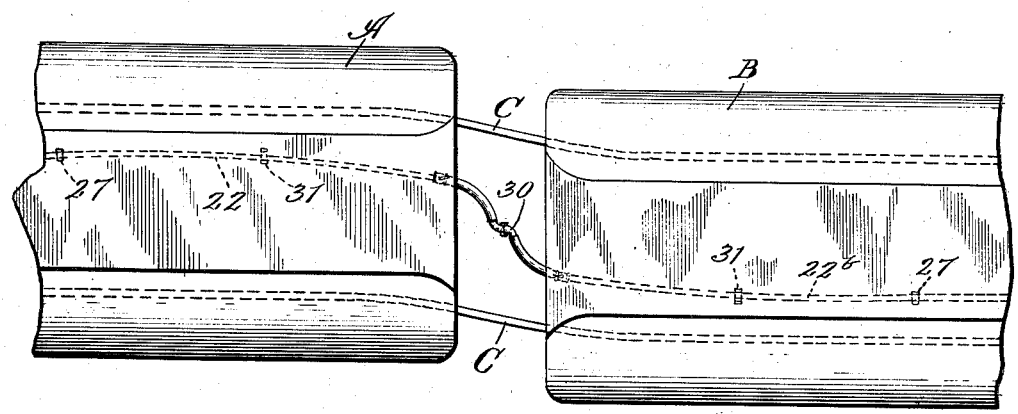
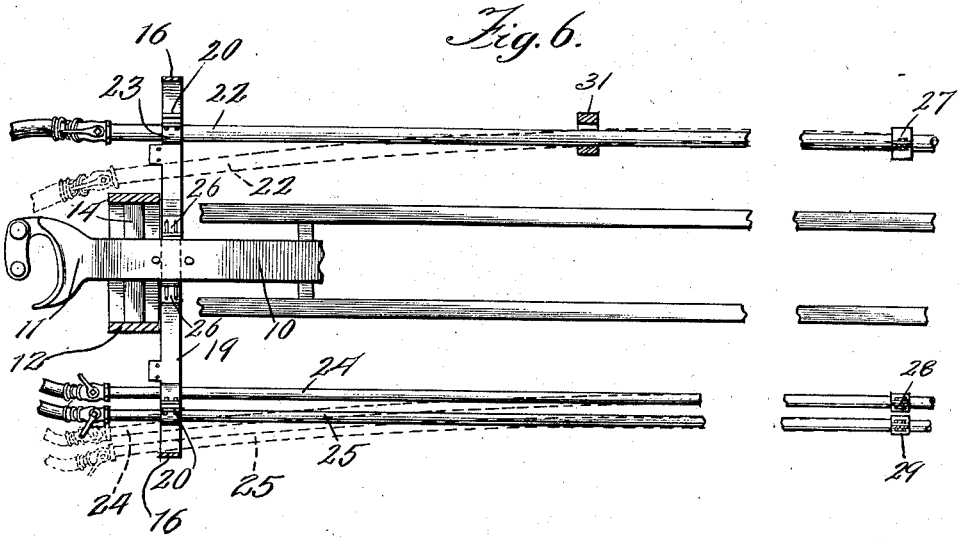

UNITED STATES PATENT OFFICE.

JOHN DAVIDSON, JR., OF CHICAGO, ILLINOIS.

APPARATUS FOR SUPPORTING TRAIN-PIPES.

985,149. Specification of Letters Patent. Patented Feb. 28, 1911.

Application filed August 25, 1910. Serial No. 578,936.

*To all whom it may concern:*

Be it known that I, JOHN DAVIDSON, Jr., a citizen of the United States, residing at Chicago, in the county of Cook and State of Illinois, have invented certain new and useful Improvements in Apparatus for Supporting Train-Pipes, of which the following is a specification.

My invention relates to apparatus for supporting train pipes, and the invention has for its object to provide a device for supporting the end of a steam or air train-pipe section which will permit or cause the pipe, or end of the pipe, to shift when the train goes around a curve so as to take off or decrease the strain on the train-pipe coupling, which, under some conditions, has a tendency to cause the coupler heads to become uncoupled or the hose pipe to be ruptured or unduly strained.

The invention is intended particularly for use in connection with train-pipe sections which are connected together by means of couplings, such, for example, as the familiar Sewall gravity couplings, which automatically uncouple when sufficient strain or pull is exerted upon them. It frequently happens that, when couplers of this type are used, and particularly when the hose is relatively large and stiff, the swinging motion of the cars in going around reverse curves will cause the coupling to be uncoupled. Several devices of one kind or another, ordinarily in the nature of locks, have been devised for overcoming this tendency of the gravity coupler to automatically unlock at the wrong time. The present invention seeks to obviate the difficulty by a shifting of the pipe sections themselves, or portions of the same. Preferably, the shifting is automatically accomplished, as will be hereinafter described, by a connection between the pipe support and the drawbar of the car.

The invention, in a preferred embodiment, is illustrated in the accompanying drawings, wherein,—

Figure 1:
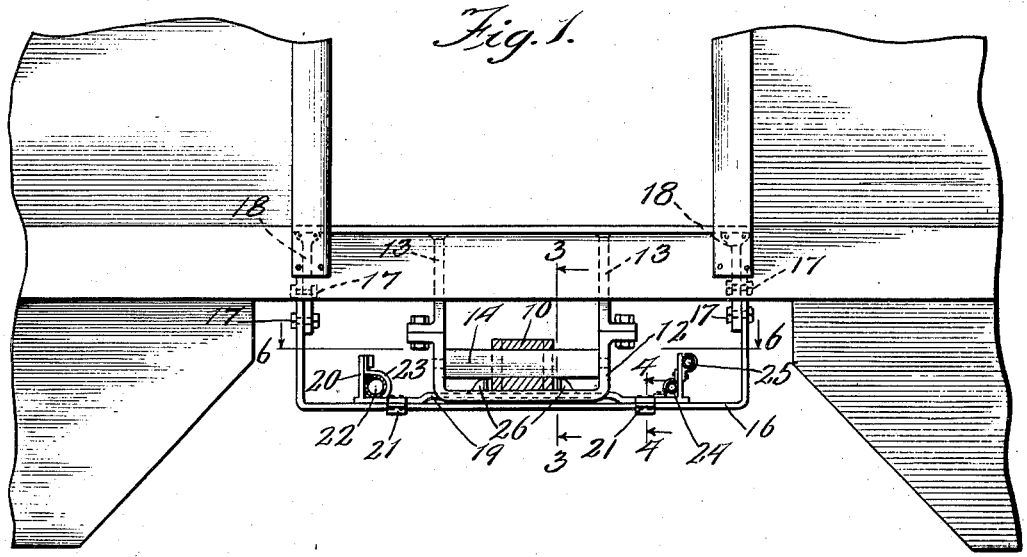
Figure 2:
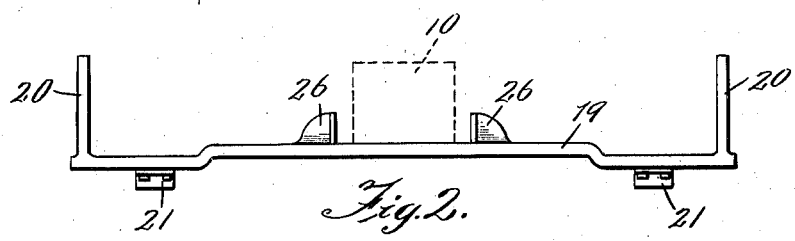
Figure 3:
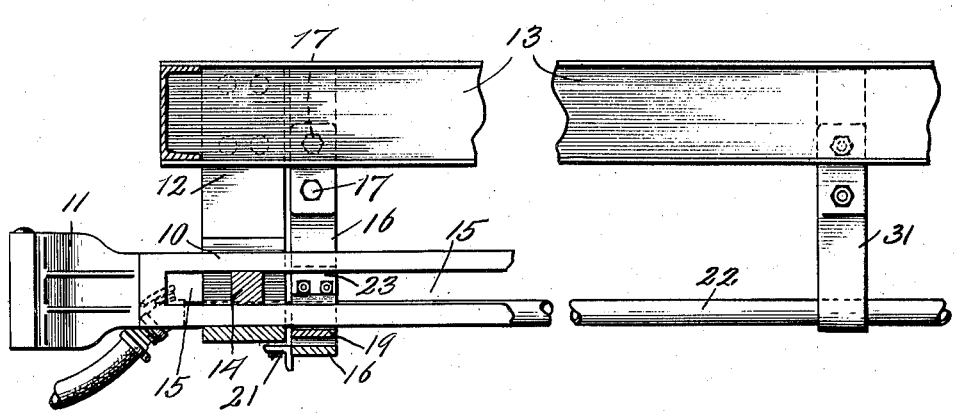
Figure 4:

Figure 1 is a fragmentary end elevation of a railway passenger car; Fig. 2 is an elevation, on an enlarged scale, of the sliding pipe support constituting a part of my apparatus; Fig. 3 is a fragmentary sectional view taken on line 3—3 of Fig. 1, looking in the direction of the arrows; Fig. 4 is a section on line 4—4 of Fig. 1; Fig. 5 is a simplified diagrammatic plan view of the ends of two adjoining cars in a train, illustrating the operation of my invention; and Fig. 6 is a sectional plan taken on line 6—6 of Fig. 1.

Like characters of reference indicate like parts in the several figures of the drawings.

Referring to the drawings, in which is shown a portion of the end of a steel railway car of ordinary construction, 10 designates the drawbar of the car, provided with the coupler head 11, by means of which the car is coupled to the next car in the train, the drawbar being shown as supported by a hanger 12 secured to the longitudinal girders or beams 13 supporting the floor of the car, the drawbar having, as is usual, some capacity for lateral movement on the transverse pin 14, which latter is secured to the hanger 12 and extends through a slot 15 in the drawbar. It will be understood that my invention might be employed in connection with other constructions of car and of draft gear.

16 designates a hanger which is secured by bolts 17 to the members 18 of the car underframe so that it preferably stands back of the drawbar hanger 12. Mounted on this hanger is the movable or sliding pipe support 19, shown in detail in Fig. 2, this device being preferably formed with the upstanding flanges 20 at each end thereof, and being also preferably provided with the angle iron guides 21 on its under surface (Fig. 4).

The steam train pipe 22 is shown as being secured to one of the flanges 20 by means of the pipe clip 23. This connection is made somewhat loose, so as to allow for expansion and contraction of the pipe. The signal pipe 24 and the air-brake train pipe 25 are shown as secured in like manner to the other flange 20 by similar clips.

The slide 19 is formed on its upper surface with lugs 26 which stand one on each side of the drawbar 10, so that the lateral shift of the drawbar moves the slide in one direction or the other. The lugs normally stand a short distance away from the drawbar, so that the slighter oscillating movements of the drawbar are not communicated to the pipes. This is particularly desirable because preferably the several train-pipe sections 22, 24, 25 are rigidly secured to the body of the car at their center portions, as, for example, by the hangers designated, respectively, 27, 28 and 29 in Fig. 6. These hangers are placed at points remote enough from the ends of the pipes so that the elasticity of the pipes permits the ends to be shifted as above described.

In Fig. 5 I have shown somewhat diagrammatically portions of two cars, designated A and B, respectively. The cars are shown as going over reverse curves in the track, the rails of which track are indicated at C. For clearness, I have shown in this view only the steam train pipe sections and their coupling, these sections being designated 22 and 22ᵇ, and being shown as connected by a coupling designated 30, which may be of any desired design and construction.

Figs. 5 and 6 illustrate the deflection of the ends of the train pipe sections, so that the strain on the couplings is either eliminated or diminished. They also illustrate a preferred arrangement for diminishing the strain on the pipe at the point of attachment, 27, of the train pipe to the car. This is accomplished by providing a fulcrum for the pipe between the point 27 and the clip 23, so that the pipe is bowed, as shown by the dotted lines in Fig. 6, and the strain distributed along the pipe, instead of being entirely, or almost entirely, at the point 27. The fulcrum consists of a hanger or loop 31. The space in the loop is a trifle wider than the diameter of the pipe.

As the devices, constructions and arrangements by which my invention is carried out will in any particular case depend somewhat upon the construction of car on which the invention is used, I do not limit myself to the particulars shown and described, except as the same are made specific limitations on certain of the claims herein.

I have shown a device for supporting three train pipe sections, but it will be understood that a greater or less number of pipes might be employed.

I claim:

1. The combination with a railway car, of a metal train pipe section carried thereby, and a supporting device for said train-pipe section which has a movable relation with said car.

2. The combination with a railway car, of a metal train pipe section carried thereby, a supporting device for said train pipe section which has a movable relation with said car, and means operated by a relative lateral movement between the end of said car and the next adjacent car in the train for positively shifting said support.

3. The combination with a railway car, of a metal train pipe section the center portion of which is secured to the car, and a supporting device for an end of said pipe section which has a movable relation with respect to said car.

4. The combination with a railway car, of a metal train pipe section the center portion of which is secured to the car, a supporting device for an end of said pipe section which has a movable relation with respect to said car, and means operated by a relative lateral movement between the end of said car and the next adjacent car in the train for positively shifting said support.

5. The combination with a railway car provided with apparatus for coupling it into the train, of a metal train pipe section carried by said car, and a movable support for said train pipe section connected with said coupling apparatus so as to be shifted when there is a relative lateral movement between the end of said car and the next adjacent car in the train.

6. The combination with a railway car provided with a drawbar having capacity for lateral movement, of a metal train pipe section carried by said car, and a support for said train pipe section which is connected with said drawbar so as to be shifted by the lateral movement of said drawbar.

7. The combination with a railway car provided with a drawbar having capacity for lateral movement, of a metal train-pipe section secured at its center portion to the car, and a movable support for the end of said train pipe section which is connected with said drawbar so as to be shifted by the lateral movement thereof.

8. The combination with a railway car, of a train pipe section, a hanger on said car, and a sliding support on the hanger to which said train pipe section is secured.

9. The combination with a railway car provided with a drawbar having capacity for lateral movement, of a train pipe section, a hanger on said car, a sliding support on said hanger to which said train pipe section is secured, and means on said support adapted to be engaged by said drawbar.

10. The combination with a railway car provided with a drawbar having capacity for lateral movement, of a train pipe section, a hanger on said car, a sliding support on said hanger to which said train pipe section is secured, and lugs on said support which stand one on each side of said drawbar, substantially as described.

11. The combination with a plurality of railway cars, of coupling devices having lateral movement by means of which said cars are coupled together, metal train pipe sections carried by said cars, coupling means for coupling together corresponding train pipe sections on adjacent cars, and means actuated by said coupling devices for shifting the ends of said train pipe sections when said cars go around a curve.

12. The combination with a railway car, of a train pipe section which is attached to said car at a point remote from one end thereof, a supporting device for said end of said pipe section which has movable relation with respect to said car, and means between the point of attachment to the car and said supporting device which provides a fulcrum for said pipe, substantially as described.

13. The combination with a railway car, of a train pipe section which is attached to said car at a point remote from one end thereof, a supporting device for said end of said pipe section which has movable relation with respect to said car, means between the point of attachment to the car and said supporting device which provides a fulcrum for said pipe, and means operated by a relative lateral movement between the end of said car and the next adjacent car in the train for positively shifting said support.

14. The combination with a railway car, of a train pipe section, means for supporting the portion of said train pipe section adjacent one end thereof comprising two pipe hangers attached to said car, the pipe section having a loose connection with the pipe hanger nearest said end, and a support for said end of said pipe section which has the capacity for movement laterally of the car, substantially as described.

15. The combination with a railway car provided with a drawbar having capacity for lateral movement, of a train pipe section, a support for one end of said train pipe section which is connected with said drawbar so as to be shifted by the lateral movement thereof, and means for supporting the portion of the pipe adjacent said end comprising two hangers attached to said car, the pipe section having a loose connection with the hanger nearest said end thereof, substantially as described.

16. The combination with a railway car provided with a drawbar having capacity for lateral movement, of a train pipe section, a hanger on said car, a sliding support on said hanger to which the end of said train pipe section is secured, and lugs on said support which stand one on each side of said drawbar, but normally a short distance therefrom, substantially as described.

17. The combination with a railway car provided with a drawbar having capacity for lateral movement, of a train pipe section which is attached to the car at a point remote from one end thereof, a hanger on said car, a sliding support on said hanger to which said end of said train pipe section is secured, lugs on said support which stand one on each side of said drawbar, and means located between said support and said point of attachment of the pipe section which constitutes a fulcrum for said pipe, substantially as described.

18. The combination with a railway car provided with a drawbar having capacity for lateral movement, of a train pipe section attached to said car at a point remote from one end thereof, a sliding support for said end of said train pipe section, a hanger on which said sliding support is mounted, lugs on said support which stand on opposite sides of said drawbar, and a pipe hanger, with which said pipe section has a loose connection, located between said point of attachment of said pipe section and said sliding support, substantially as described.

JOHN DAVIDSON, Jr.

Witnesses:
P. H. TRUMAN,
EDWIN JOHNSON.